March 27, 1928.

P. F. SHIVERS 1,664,325

MOTOR REGULATOR

Filed March 21, 1924   2 Sheets-Sheet 1

INVENTOR.

Paul F. Shivers,

BY

Hood + Hahn

ATTORNEYS.

March 27, 1928.

P. F. SHIVERS

MOTOR REGULATOR

Filed March 21, 1924  2 Sheets-Sheet 2

INVENTOR.
Paul F. Shivers,
BY
Hood + Hahn.
ATTORNEYS

Patented Mar. 27, 1928.

1,664,325

UNITED STATES PATENT OFFICE.

PAUL F. SHIVERS, OF WABASH, INDIANA, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE.

MOTOR REGULATOR.

Application filed March 21, 1924. Serial No. 700,777.

My invention relates to improvements in controlling means for electric motors and particularly to alternating current electric motors.

One of the objects of my invention is to provide means for controlling the starting and stopping of an electric motor in which the switching contacts for controlling said starting and stopping will only have to carry current of low voltage, thereby eliminating sparking of the contacts on the opening and closing of the circuit and permitting of the use of small switches and light contacts.

My invention is particularly adaptable for use in connection with electric motors for controlling temperature regulating means as it permits of the use of low voltage current through the thermostatically controlled switches and at the same time the use of high voltage current for operating the electric motor for operating the temperature controlling means.

For the purpose of disclosing my invention, I have illustrated certain embodiments thereof in the accompanying drawings, in which Fig. 1 is a diagramamtic view of an apparatus embodying my invention showing the same used in connection with an induction motor;

Figure 1:
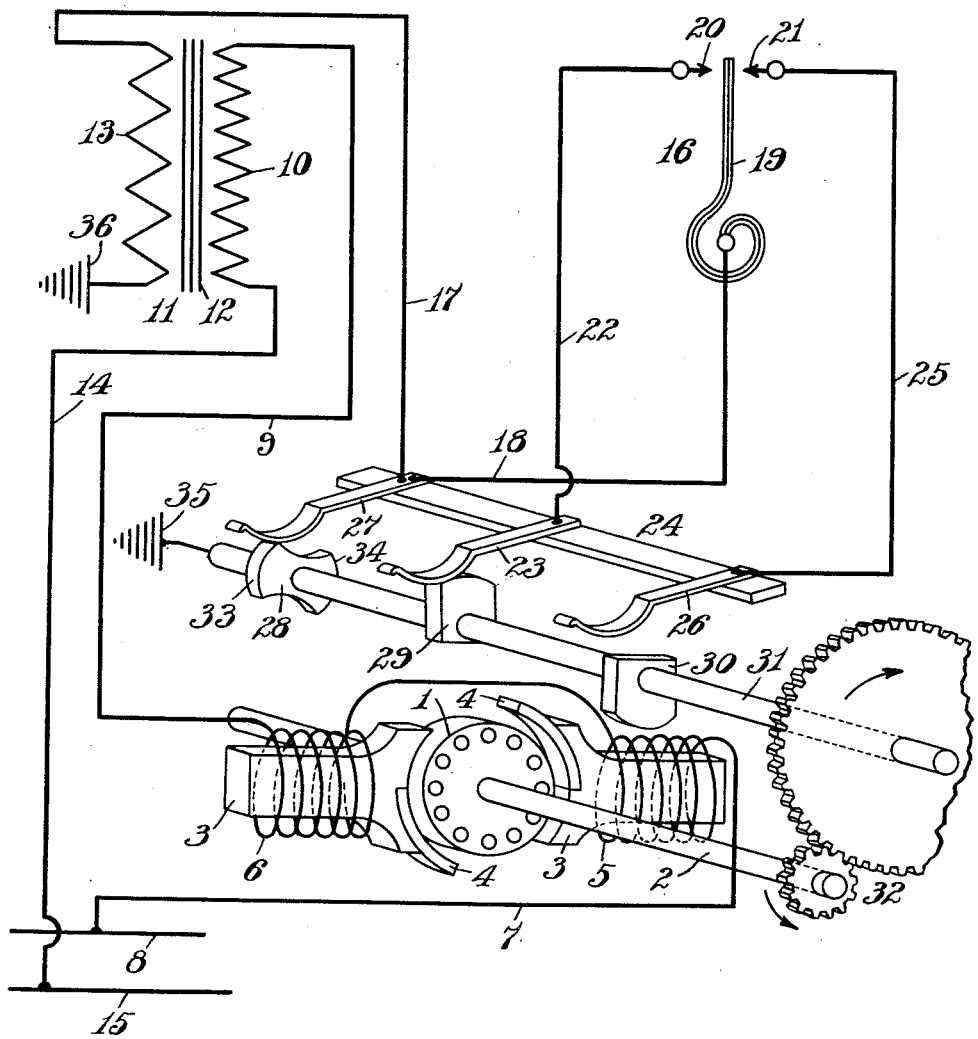

In the apparatus illustrated, I provide an electric motor of the squirrel-cage type having a rotor 1 mounted on a shaft 2 and provided with the usual poles 3 of this type of induction motor. These poles are provided with shading coils 4 for producing a phase angle between the flux in the shaded and unshaded portions of the pole faces to produce rotation of the motor. The poles are provided with the usual stator windings 5 and 6, one terminal of which is connected by the conductor 7 with the supply main 8. The opposite terminal of the stator windings is connected by conductor 9 with one terminal of the primary winding 10 of a transformer 11 having the usual laminated core 12 and a secondary winding 13, which as shown, has a smaller number of turns than the primary 10 and as a result the voltage of the induced current in the secondary will be lower than that imposed upon the primary. In other words, the transformer is what is known in the art as a step down transformer. The opposite terminal of the primary winding 10 is connected by conductor 14 with the supply main 15.

The circuit of the secondary winding 13 of the transformer is adapted to be controlled by a thermostatic switch 16 and to this end one terminal of the secondary winding is connected by conductors 17 and 18 with the temperature responsive element 19 of said switch. This switch 16 is provided with a pair of stationary contacts 20 and 21 between which the element 19 is located and which element is adapted to engage either one or the other of the contacts. The contact 20 is connected by a conductor 22 with a contact finger 23 of a switching mechanism 24. The contact 21 is connected by a conductor 25 with a contact finger 26 of said switching mechanism and the thermostatic element 19 is connected by conductor 18 with a contact finger 27 of the switching mechanism 24. It will also be noted that the conductor 17 is connected with this contact finger 27. The contact fingers 27, 23 and 26 are adapted to be respectively engaged by movable contacts 28, 29, and 30 in the form of cam members mounted upon and rotatable with a shaft 31 having a gear connection 32 with the shaft 2 of the motor. The cam member 28 is provided with a pair of cam surfaces 33 and 34, while the cam members 29 and 30 are provided each with only one cam surface. The shaft 31 is grounded as at 35 and one terminal of the secondary winding 13 is likewise grounded as at 36 or, if desired, this terminal may be connected by wire with the shaft 31.

In operation, when the regulating apparatus is at rest in its normal operating condition, the contacting surfaces 34 and 33 are out of contact with the finger 27 and one of the cam members 29 or 30 is in contact with its contact finger.

For the sake of illustrating the operation, we will assume that contact finger 23 is in engagement with its cam 29 and that the thermostatic element 19 is intermediate of the contacts 20 and 21. The primary winding 10 is so proportioned with respect to the stator windings 5 and 6 of the motor that with the secondary winding 13 in open circuit condition, the counter-electromotive-force set up in the primary winding 10 will be sufficient to prevent the passage of sufficient current through the stator windings 5 and 6 to cause the motor to operate. Assuming that the temperature has affected the thermostatic element 19 to cause it to move into engagement with the contact 20, then the circuit of the secondary winding will be closed by the way of conductors 17 and 18, thermostatic element 19, contact 20, conductor 22, contact 23, cam 29, shaft 31 to ground, and back by ground to the opposite terminal of the secondary winding. The closing of this circuit so reduces the counter-electromotive-force set up in the primary winding 10, that sufficient current will pass through the stator windings of the motor to cause the motor to run and at the same time the shaft 31 will be rotated with the motor, thereby moving the cam 29 out of contact with the finger 23 but at the same time moving contact surface 33 into engagement with contact finger 27 so that circuit will be established from one terminal of the secondary winding 13 by way of conductor 17, contact finger 27, cam 28 to ground, and the closed circuit condition of the secondary winding 13 will be maintained until cam surface 33 passes out of engagement with contact finger 27, which will open the circuit of the secondary winding, thereby causing the motor to stop. By this time, however, the cam 30 will have been moved into engagement with the contact finger 26 so that the parts will be in condition to operate as above described, when the thermostatic element is affected by the temperature to cause it to move into engagement with the contact finger 21.

Figure 2:
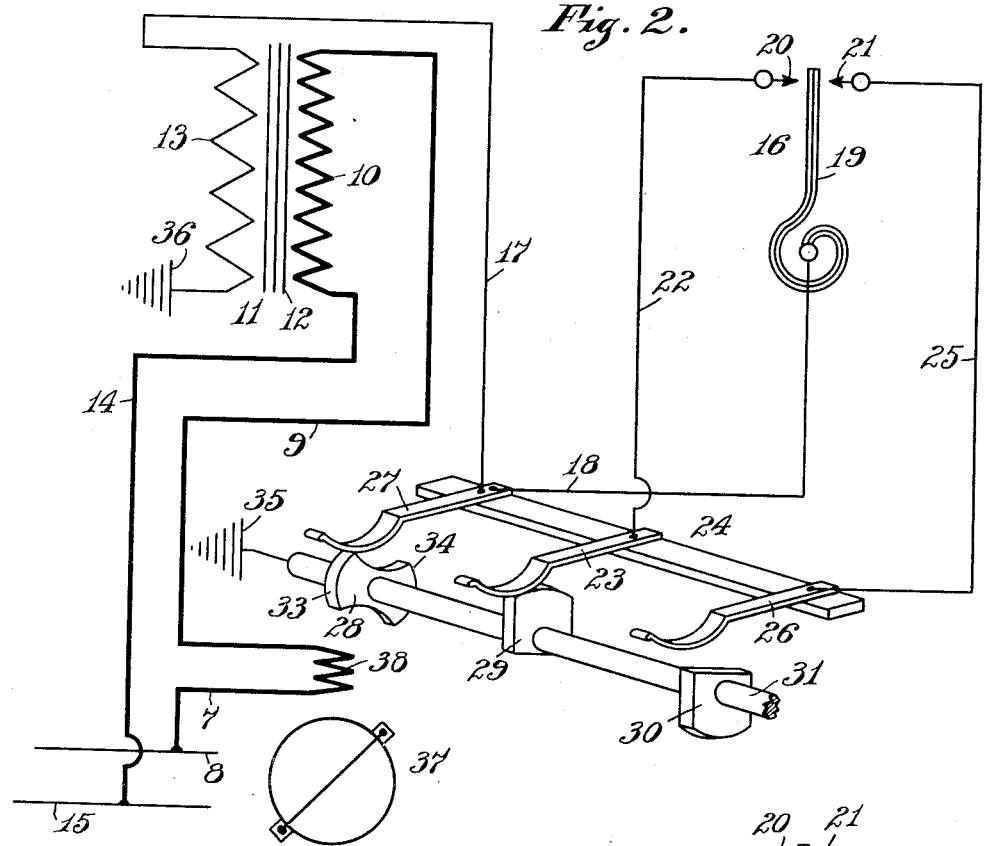
Fig. 2 is a diagrammatic view illustrating the use of a repulsion motor.

In Fig. 2 I have illustrated my improvement in which, instead of the induction motor illustrated in Fig. 1, I have provided a repulsion motor 37 having the field winding 38 connected in closed circuit relation with the mains 8 and 15 by the conductors 7 and 19 and 14 and having included in series therewith, the primary winding 10 of the transformer.

Figure 3:
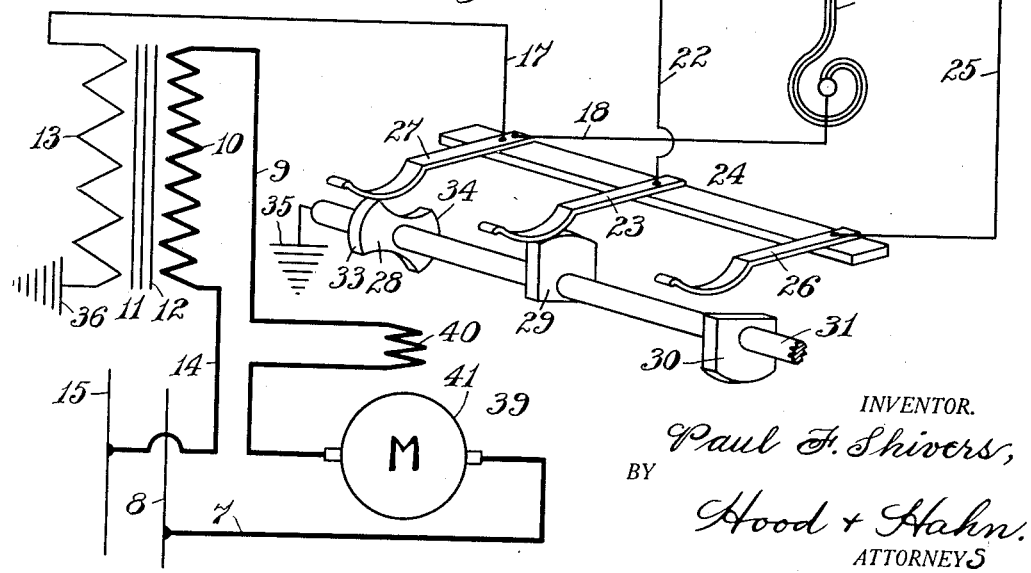
Fig. 3 is a diagrammatic view showing the same used in connection with a series motor.

In Fig. 3 I have illustrated still another modification of my invention wherein I use a series motor 39 wherein the field windings 40 and armature windings 41 are connected in closed circuit relation with the supply mains 8 and 15 by means of the circuit including the conductors 7 and 9 and 14 and the primary winding 10 of the transformer.

I claim as my invention:

1. The combination, with an electric motor having the windings thereof normally connected in closed circuit relation with the supply mains, of a step down transformer having relatively stationary windings and having its primary winding connected in series with the windings of said motor and so proportioned with respect thereto that when the secondary winding of said transformer is open circuited the counter-electromotive-force set up in said primary windings will prevent the passage of sufficient current to said motor to operate the same, a circuit including the secondary winding of the transformer and a switch in said circuit located at a distant point and adapted to open and close the circuit of the secondary winding.

2. The combination, with an alternating current electric motor having its stator windings normally connected in closed circuit relation with the supply mains, of a stepdown transformer having relatively stationary windings and having its primary winding connected in series with the stator windings of said motor and so proportioned with respect thereto that when the secondary winding of the transformer is open circuited the counter-electromotive-force set up in said primary winding will prevent the passage of sufficient current to said motor to operate the same, a circuit including the secondary winding of the transformer and a switch in said circuit located at a distant point and adapted to open and close the circuit of the secondary winding.

3. The combination with an electric motor having its windings normally connected in closed circuit relation with the supply mains, of a step down transformer having relatively stationary windings and having its primary winding connected in series with the windings of said motor and so proportioned with respect thereto that when the secondary winding of the transformer is open circuited the counter-electromotive force set up in said primary winding will prevent the passage of sufficient current to the motor to operate the same and a thermostatically operated switch for opening and closing the circuit of the secondary winding.

4. The combination, with an electric motor having its windings normally in closed circuit relation with respect to the supply mains, of a transformer having its primary winding connected in series with the windings of said motor and so proportioned with respect thereto that when the secondary winding is open circuited the counter-electromotive-force set up in said primary winding will prevent the passage of sufficient current to said motor to operate the same, a thermostatically operated switch for opening and closing the circuit of the secondary winding, and additional circuit controlling means for opening the circuit of the secondary winding after the motor has operated for a predetermined period.

5. The combination, with an electric motor having its windings normally in closed circuit relation with the supply mains, of a transformer having its primary winding connected in series with the windings of said motor and so proportioned with respect thereto that when the secondary winding of said transformer is open circuited the counter-electromotive-force set up in the primary winding of the transformer will prevent the passage of sufficient current to the motor to operate the same, a thermostatically operated switch for opening and closing the circuit of the secondary winding, and additional circuit controlling means for opening the circuit of the secondary winding after the motor has operated for a predetermined period and conditioning the circuit of the secondary winding to be again closed by the thermostatic switch.

6. The combination, with an electric motor having its windings in closed circuit relation with the supply mains, of a transformer having its primary winding connected in series with the windings of said motor and so proportioned with respect thereto that when the secondary winding of the transformer is open circuited the counter-electromotive-force set up in said primary winding will prevent the passage of sufficient current to said motor to operate the same, a thermostatic switch for opening and closing the circuit of the secondary winding and including a movable switch member and a pair of stationary contacts and additional circuit controlling means for opening the circuit established through one contact of the thermostatic switch after the motor has run for a predetermined period and establishing a circuit to the other contact of said switch.

7. The combination, with an electric motor having its windings normally connected in closed circuit relation with the supply mains, of a transformer having its primary winding connected in series with the windings of said motor and so proportioned with respect thereto that when the secondary winding is open circuited the counter-electromotive-force set up in the primary winding will prevent the passage of sufficient current to said motor to operate the same, a thermostatic switch for opening and closing the circuit of the secondary winding including a movable switch member and a pair of stationary contacts, and additional circuit controlling means operated by said motor for opening the circuit established through one contact of the thermostatic switch after the motor has run for a predetermined period and establishing the circuit to the other contact of the switch.

8. The combination, with an electric motor having its windings normally connected in closed circuit relation with the supply mains, of a transformer having its primary winding connected in series with the windings of said motor and so proportioned with respect thereto that when the secondary winding is open circuited the counter-electromotive-force set up in said primary winding will prevent the passage of sufficient current to said motor to operate the same, a thermostatic switch for opening and closing the circuit of the secondary winding, including a movable switch member and a pair of stationary contacts, and a second controlling means for said secondary winding having a movable contact for closing the circuit independently of the thermostatic switch and movable contacts for closing the circuit to each of the contacts of the thermostatic switch.

9. The combination, with an electric motor having its windings normally connected in closed circuit relation with the supply mains, of a transformer having its primary winding connected in series with the windings of said motor and so proportioned with respect thereto that when the secondary winding is open circuited the counter-electromotive-force set up in said primary winding will prevent the passage of sufficient current to said motor to operate the same, a thermostatic switch for opening and closing the circuit of the secondary winding, including a movable switch member and a pair of stationary contacts and a second controlling means for said secondary winding having a movable contact for closing the circuit independently of the thermostatic switch, and movable contacts for closing the circuit to each of the contacts of the thermostatic switch, one of the contacts of said second controlling means being always in closed position.

10. The combination with an electric motor having its windings normally in closed circuit relation with respect to the supply mains, of a transformer so constructed that the induced voltage is lower than the applied voltage and having its primary winding connected in series with the windings of said motor and so proportioned with respect thereto that when the secondary winding is open circuited the counter-electromotive force set up in said primary winding will prevent the passage of sufficient current to said motor to operate the same, a thermostatically operated switch for opening and closing the circuit of the secondary winding and additional circuit controlling means for opening the circuit of the secondary winding after the motor has operated for a predetermined period.

11. The combination with an electric motor having its windings normally connected in closed circuit relation with the supply mains, of a transformer so constructed that the induced current therein is of lower voltage than the applied current and having its primary windings connected in series with the windings of said motor and so proportioned with respect thereto that when the secondary winding of the transformer is open circuited the counter-electromotive force set up in the primary winding will prevent the passage of sufficient current to the motor to operate the same and a thermostatically operated switch for opening and closing the circuit of the secondary winding.

12. The combination with an electric motor having its windings normally in closed circuit relation with the supply mains, of a transformer so constructed that the induced current therein is of lower voltage than the applied current and having its primary winding connected in series with the windings of said motor and so proportioned with respect thereto that when the secondary winding of the transformer is open circuited the counter-electromotive force set up in the primary winding of the transformer will prevent the passage of sufficient current to the motor to operate the same, a thermostatically operated switch for opening and closing the circuit of the secondary winding and additional circuit controlling means for opening the circuit of the secondary winding after the motor has operated for a predetermined period and conditioning the circuit of the secondary winding to be again closed by the thermostatic switch.

13. The combination with an electric motor having its windings normally in closed circuit relation with the supply mains, of a transformer so constructed that the induced current therein is of lower voltage than the applied current, and having its primary winding connected in series with the windings of said motor and so proportioned with respect thereto that when the secondary winding of said transformer is open circuited the counter-electromotive force set up in the primary winding of the transformer will prevent the passage of sufficient current to the motor to operate the same, a thermostatically operated switch for opening and closing the circuit of the secondary winding and additional circuit controlling means driven from said motor for opening the circuit of the secondary winding after the motor has operated for a predetermined period and for conditioning the circuit of the secondary winding to be again closed by the thermostatic switch.

14. The combination with an electric motor having its windings normally connected in closed circuit relation with the supply mains, of a transformer having relatively stationary primary and secondary windings, the secondary winding consisting of fewer turns than the primary winding, the primary winding being connected in series with the windings of said motor and so proportioned with respect thereto that when the secondary winding of the transformer is open circuited the counter-electromotive force set up in said primary winding will prevent the passage of sufficient current to the motor to operate the same, and a thermostatically operated switch for opening and closing the circuit of the secondary winding.

In witness whereof, I, PAUL F. SHIVERS, have hereunto set my hand at Wabash, Indiana.

PAUL F. SHIVERS.